(12) United States Patent
Tsunoda (10) Patent No.: US 10,589,599 B2
(45) Date of Patent: Mar. 17, 2020

(54) AIR CONDITIONER FOR VEHICLE

(71) Applicant: HONDA MOTOR CO., LTD., Tokyo (JP)

(72) Inventor: Isao Tsunoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 15/783,161

(22) Filed: Oct. 13, 2017

(65) Prior Publication Data
US 2018/0105021 A1 Apr. 19, 2018

(30) Foreign Application Priority Data

Oct. 18, 2016 (JP) .................................. 2016-204266

(51) Int. Cl.
*B60H 1/32* (2006.01)
*F25B 41/04* (2006.01)
(Continued)

(52) U.S. Cl.
CPC ....... *B60H 1/3204* (2013.01); *B60H 1/00007* (2013.01); *B60H 1/00921* (2013.01);
(Continued)

(58) Field of Classification Search
CPC ............. B60H 1/3204; B60H 1/00007; B60H 1/3207; B60H 1/321; B60H 1/00921;
(Continued)

(56) References Cited

U.S. PATENT DOCUMENTS 6,314,750 B1 * 11/2001 Ishikawa ............ B60H 1/00921
62/324.1
9,259,993 B2 * 2/2016 Aoun ................. B60H 1/00921
(Continued)

FOREIGN PATENT DOCUMENTS

JP H10-203148 A 8/1998
JP 2012-188108 A 10/2012
(Continued)

OTHER PUBLICATIONS

Office Action dated Aug. 20, 2019, issued in counterpart JP application No. 2016-204266, with English translation. (4 pages).

*Primary Examiner* — Devon Russell
(74) *Attorney, Agent, or Firm* — Westerman, Hattori, Daniels & Adrian, LLP (57) ABSTRACT

To provide an air conditioner for a vehicle having a simple configuration and capable of controlling temperature in a wide range. In a dehumidification heating operation in which a refrigerant is circulated through a first heat exchanger, a second heat exchanger, an evaporator and a compressor in the order named so as to radiate the heat of the refrigerant into the first heat exchanger, there is provided a refrigerant heating means which heats the refrigerant when an outside air temperature is not higher than a predetermined temperature and when an opening degree of the second expansion valve which expands the refrigerant flowing out from the second heat exchanger is larger than an opening degree of the first expansion valve which expands the refrigerant flowing out from the first heat exchanger.

7 Claims, 8 Drawing Sheets

(51) Int. Cl.
*B60H 1/00* (2006.01)
*F24F 3/14* (2006.01)
*F25B 13/00* (2006.01)
*F25B 39/00* (2006.01)
*F25B 49/02* (2006.01)
*F25B 5/04* (2006.01)
*F25B 6/04* (2006.01)

(52) U.S. Cl.
CPC ............... *F24F 3/14* (2013.01); *F25B 13/00* (2013.01); *F25B 39/00* (2013.01); *F25B 41/04* (2013.01); *F25B 49/02* (2013.01); *B60H 2001/00949* (2013.01); *F24F 2003/144* (2013.01); *F25B 5/04* (2013.01); *F25B 6/04* (2013.01); *F25B 2341/0662* (2013.01); *F25B 2400/01* (2013.01); *F25B 2400/0403* (2013.01); *F25B 2400/0409* (2013.01); *F25B 2400/0411* (2013.01); *F25B 2500/31* (2013.01); *F25B 2600/0253* (2013.01); *F25B 2600/2501* (2013.01); *F25B 2600/2513* (2013.01)

(58) Field of Classification Search
CPC ....... B60H 1/00914; B60H 2001/00949; F24F 3/14; F25B 13/00; F25B 39/00; F25B 49/02; F25B 2313/02343
See application file for complete search history.

(56) References Cited

U.S. PATENT DOCUMENTS

| | | | |
|---|---|---|---|
| 9,810,465 B2* | 11/2017 | Kang | F25B 5/00 |
| 9,829,237 B2* | 11/2017 | Kang | F25B 47/022 |
| 9,834,061 B2* | 12/2017 | Citti | B60H 1/00328 |
| 9,902,235 B2* | 2/2018 | Tanda | B60H 1/00921 |
| 10,202,018 B2* | 2/2019 | Ishida | B60H 1/00921 |
| 2012/0227431 A1 | 9/2012 | Wang et al. | |
| 2013/0305759 A1* | 11/2013 | Tsunoda | F25D 21/004 62/151 |
| 2016/0068047 A1 | 3/2016 | Kobayashi et al. | |

FOREIGN PATENT DOCUMENTS

| | | |
|---|---|---|
| JP | 2012-225637 A | 11/2012 |
| JP | 2013-256230 A | 12/2013 |
| JP | 2014-88093 A | 5/2014 |
| JP | 2014-211265 A | 11/2014 |

* cited by examiner

AIR CONDITIONER FOR VEHICLE

CROSS REFERENCES TO RELATED APPLICATIONS

The present application claims priority under 35 U.S.C. § 119 to Japanese Patent Application No. 2016-204266, filed Oct. 18, 2016, entitled "Air Conditioner for Vehicle." The contents of this application are incorporated herein by reference in their entirety.

TECHNICAL FIELD

The present disclosure relates to an air conditioner for a vehicle.

BACKGROUND

Figure 13:
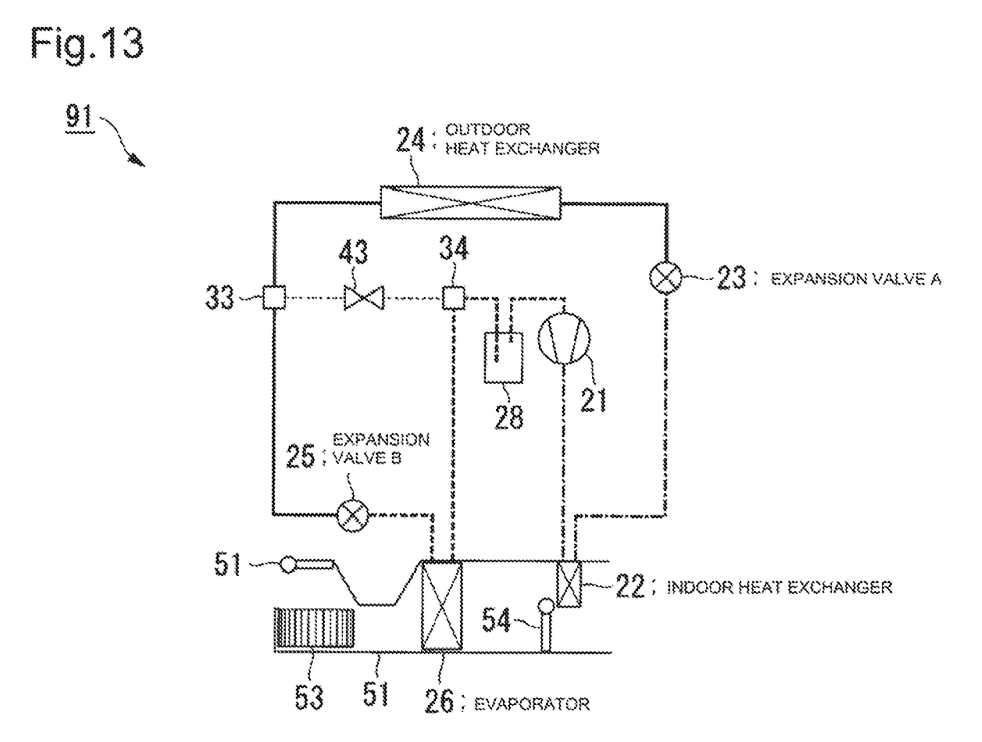
FIG. 13 is a diagram showing an example of a conventional air conditioner for the vehicle.

Traditionally, there is proposed an air conditioner for a vehicle which performs dehumidification heating operation by utilizing a heat pump cycle (see Japanese Patent Application Laid-Open Publication No. 2013-256230). For example, the air conditioner 91 for the vehicle as shown in FIG. 13 is provided with a compressor 21, an indoor heat exchanger 22, an expansion valve A 23, an outdoor heat exchanger 24, an expansion valve B 25 and an evaporator 26 as component elements. In the dehumidification heating operation, a refrigerant is circulated in the order named in a circuit composed of these component elements. The evaporator 26 and the indoor heat exchanger 22 are accommodated in a duct 51, and the evaporator 26 is arranged upstream of the indoor heat exchanger 22 relative to a circulating direction of air-conditioning air within the duct 51.

As a method of regulating a temperature of the air-conditioning air, there is known a method of adjusting an opening ratio between the expansion valve A 23 and the expansion valve B 25 so as to lower the temperature of the evaporator 26 to zero or below, and of raising the indoor heat exchanger 22 provided downstream of the evaporator 26 relative to the circulating direction of the air-conditioning air to a target temperature or above.

In this method, an opening degree of the expansion valve B 25 between the evaporator 26 and the outdoor heat exchanger 24 arranged upstream of the evaporator relative to the circulating direction of the refrigerant is controlled so as to generate a pressure difference between the refrigerant of the evaporator 26 and the refrigerant of the outdoor heat exchanger 24. When the outside air temperature is low, the temperature of the evaporator 26 is required to be higher than an evaporator freezing limit temperature (for example, zero degrees centigrade) so as to prevent freezing. Further, the temperature of the outdoor heat exchanger 24 installed on the upstream side of the evaporator 26 relative to the circulating direction of the refrigerant is not able to be lowered below the temperature of the evaporator 26. A temperature difference between the temperature of the refrigerant of the outdoor heat exchanger 24 and an outside air temperature is not able to be increased, so that a heat absorption amount from the outside air supplied to the outdoor heat exchanger 24 to the refrigerant is not obtained sufficiently. Therefore, there may be cases where a sufficiently high temperature as a desired blow-off temperature is not obtained. The blow-off temperature means the temperature of the air-conditioning air discharged from the duct 51.

Generally, an upper limit of controllable blow-off temperature tends to become lower as the outside air temperature becomes low.

Figure 14A:
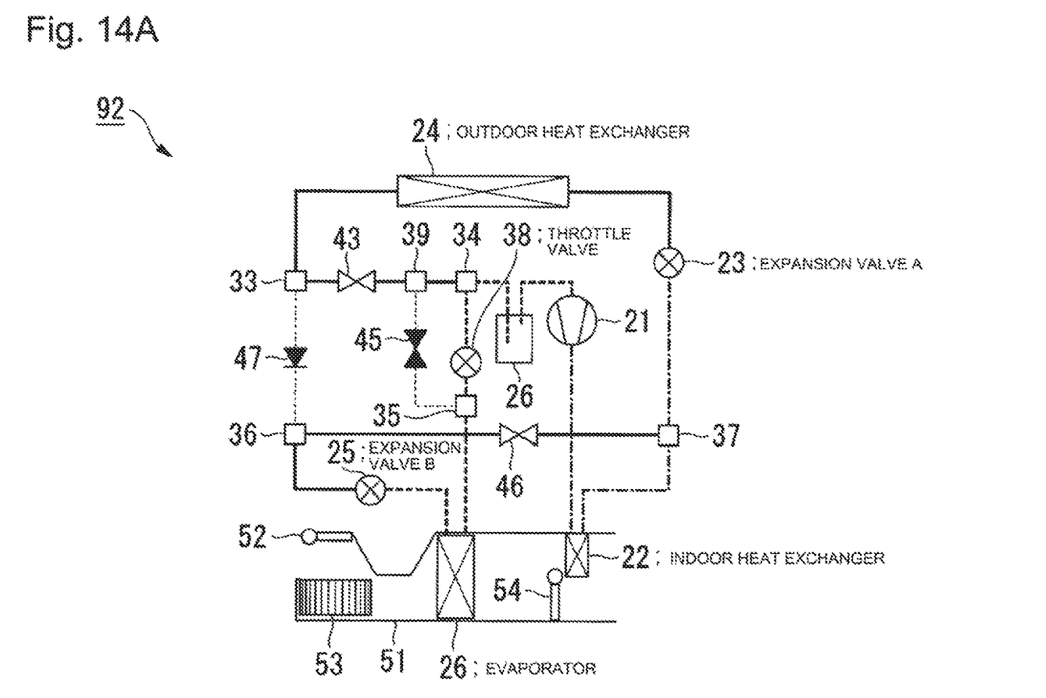
FIGS. 14A and 14B are a diagram showing another example of a conventional air conditioner for the vehicle.
Figure 14B:
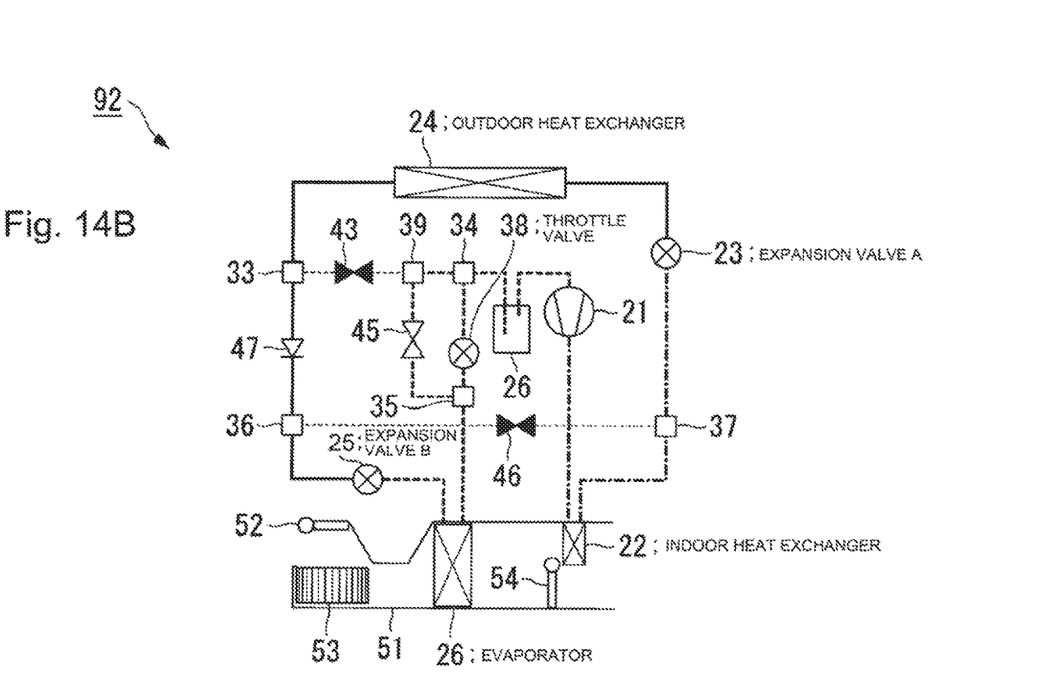

Therefore, like an air conditioner 92 for a vehicle as illustrated in FIGS. 14A and 14B, such a configuration that the outdoor heat exchanger 24 and the evaporator 26 are arranged in parallel to each other in the circulation circuit of the refrigerant and a throttle valve 38 is provided in an exhaust port of the refrigerant from the evaporator 26 is proposed. According to this configuration, an evaporation temperature of the refrigerant of the evaporator 26 can be raised above the temperature of the refrigerant of the outdoor heat exchanger 24 by controlling an opening degree of the throttle valve 38. Thus, it is possible to achieve both ensuring of the heat absorption amount in the outdoor heat exchanger 24 and prevention of the freezing of the evaporator 26.

SUMMARY

However, in the air conditioner 92 for the vehicle as shown in FIGS. 14A and 14B, it is necessary to switch between the circulation circuit of the refrigerant as shown in FIG. 14A and the circulation circuit of the refrigerant as shown in FIG. 14B in accordance with the outside air temperature and a range of the targeted blow-off temperature. The circulation circuit as shown in FIG. 14B has the same component elements as the circulation circuit as shown in FIG. 13. There may be cases where a circulation sound of the refrigerant is generated in connection with such switching of the circulation circuit. The circulation sound may be a factor giving an uncomfortable feeling as a noise. Further, the air conditioner 92 for the vehicle is provided with a plurality of valves for the switching of the circulation circuit, and it is necessary to control opening degrees of each valve. Therefore, component parts of the air conditioner 92 for the vehicle increase, so that the system becomes complicated.

It is preferable to provide an air conditioner for a vehicle which is simple in configuration and is capable of performing temperature control in a wide range.

According to a first aspect of the present disclosure, an air conditioner (10, 10a, 10b, 10c) for a vehicle comprises a compressor (21) for compressing a refrigerant, a first heat exchanger (22) capable of radiating heat of the refrigerant compressed by the compressor (21) into air, a first expansion valve (23) for expanding the refrigerant flowing out from the first heat exchanger (22), a second heat exchanger (24) capable of heat exchanging the refrigerant flowing out from the first expansion valve (23) and outside air, a second expansion valve (25) for expanding the refrigerant flowing out from the second heat exchanger (24), and an evaporator (26) for allowing the refrigerant flowing out from the second expansion valve (25) to absorb heat of air, wherein the air conditioner for the vehicle is operated in any operation mode of a heating mode, a cooling mode and a dehumidification heating mode, the heating mode being the operation mode in which the refrigerant is circulated through a heating circuit (F3) comprising the first heat exchanger (22), the second heat exchanger (24) and the compressor (21) in the order named so as to radiate the heat of the refrigerant into the first heat exchanger (22), the cooling mode being the operation mode in which the refrigerant is circulated through a cooling circuit (F2) comprising the second heat exchanger (24), the evaporator (26) and the compressor (21) in the order named, and the dehumidification heating mode being the operation mode in which the refrigerant is circulated through a dehumidification heating circuit (F1, F1a, F1b, F1c) comprising the first heat exchanger (22), the second heat exchanger (24), the evaporator (26) and the compressor (21) in the order named so as to radiate the heat of the refrigerant into the first heat exchanger (22) and to allow the refrigerant to absorb heat in the second heat exchanger (24), and wherein the dehumidification heating circuit (F1, F1a, F1b, F1c) further comprises a refrigerant heating means (27) capable of heating the refrigerant, and the refrigerant heating means (27) heats the refrigerant when the operation mode is in the dehumidification heating mode, when an outside air temperature is not higher than a predetermined temperature, and when an opening degree of the second expansion valve (25) is larger than an opening degree of the first expansion valve (23).

According to a second aspect of the present disclosure, in the above referred air conditioner (10, 10a, 10b, 10c) for the vehicle, when the refrigerant heating means (27) heats the refrigerant, the opening degree of the first expansion valve (23) is more increased than the opening degree before the refrigerant is heated.

According to a third aspect of the present disclosure, the above referred air conditioner (10, 10a) for the vehicle further comprises an accumulator (28) for separating a gas phase component of the refrigerant and supplying the gas phase component to the compressor (21), wherein the accumulator is provided between the evaporator (26) and the compressor (21), and the refrigerant heating means (27) is located between the evaporator (26) and the accumulator (28).

According to the present disclosure, for example, it is possible to provide the air conditioner for the vehicle which is simple in system configuration and capable of performing temperature control in a wide range.

According to the first aspect, in the case where the operation mode is in the dehumidification heating mode, since the refrigerant is heated thereby to increase in specific volume when the temperature of the outside air is low, the circulation of the refrigerant in the dehumidification heating circuit can be facilitated. Since the heated refrigerant is increased in volume by evaporation and the volume of the compressed refrigerant sent out from the compressor is increased, the first heat exchanger can be raised in temperature. Accordingly, the temperature of air-conditioning air obtained by heat radiation of the first heat exchanger is raised. Thus, the temperature control in a wider range can be achieved as compared with the case where the refrigerant heating means is not provided. Since this temperature control is able to be realized without switching a plurality of circulation circuits of the refrigerant, the generation of a circulation sound of the refrigerant due to the complication of the system and the switching of the circulation circuits can be avoided.

According to the second aspect, in the dehumidification heating circuit, the circulation of the refrigerant can be facilitated by heating. Therefore, a temperature difference between the first heat exchanger and the second heat exchanger is increased thereby to be able to raise the temperature of the first heat exchanger as compared with the case where the opening degree of the first expansion valve is maintained. Thus, the temperature control in a wide range can be achieved.

According to the third aspect, the refrigerant heating means is located in the circulating direction from the evaporator. Therefore, the refrigerant which is increased in specific volume to be obtained by heating does not experience pressure loss in the evaporator, so that the rotational frequency of the compressor can be increased until the temperature of the refrigerant passing through the refrigerant heating means is lowered below the temperature of the evaporator. Consequently, a circulation amount of the refrigerant in the dehumidification heating circuit is increased, whereby the radiation amount in the first heat exchanger can be increased. Further, since the pressure difference between the second heat exchanger and the evaporator is not increased, the temperature of the second heat exchanger can be lowered and the heat absorption amount in the second heat exchanger can be increased. Thus, the temperature can be controlled in a wide range. In the above explanation of the exemplary embodiment, specific elements with their reference numerals are indicated by using brackets. These specific elements are presented as mere examples in order to facilitate understanding, and thus, should not be interpreted as any limitation to the accompanying claims.

DETAILED DESCRIPTION

Hereinafter, embodiments of the present disclosure will be described with reference to the accompanying drawings.

Figure 1:
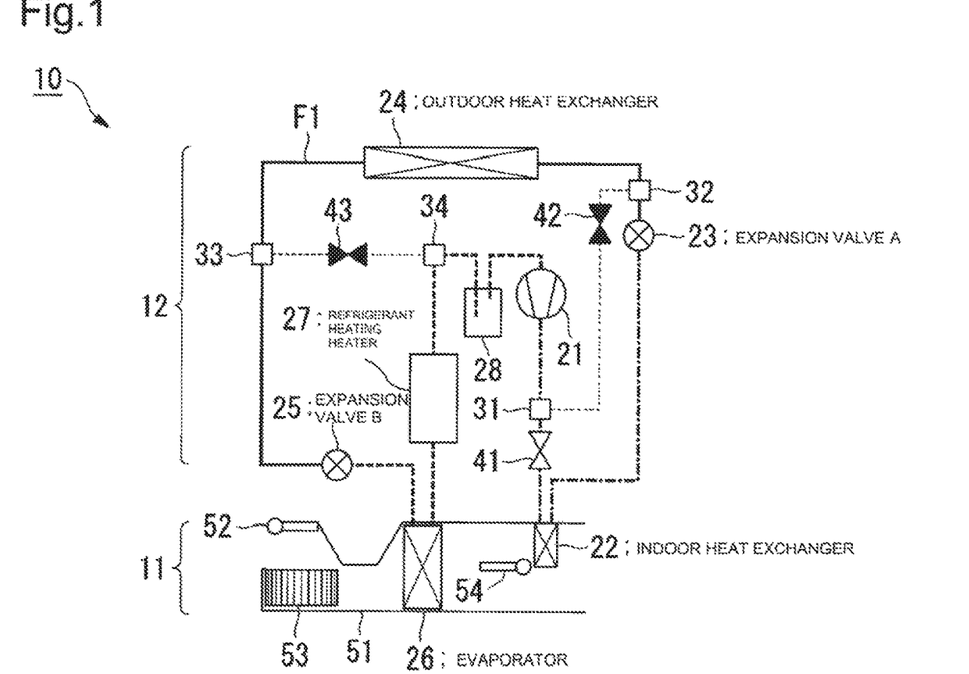
FIG. 1 is a diagram showing the dehumidification heating operation of an air conditioner for a vehicle in accordance with a first embodiment of the present disclosure.
Figure 2:
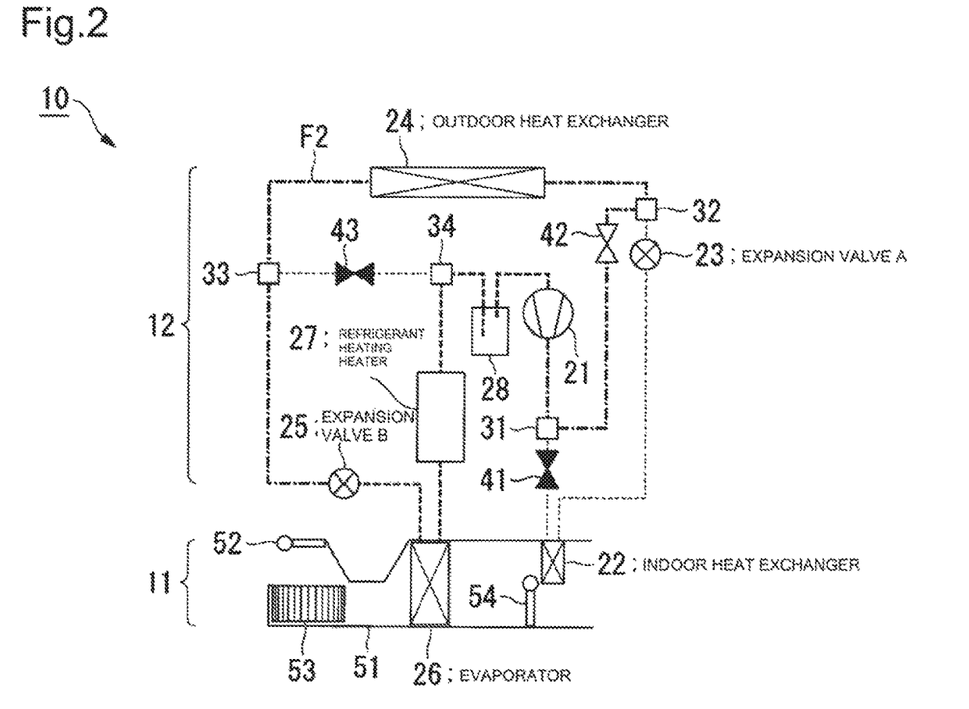
FIG. 2 is a diagram showing the cooling operation of the air conditioner for the vehicle in accordance with the first embodiment of the present disclosure.
Figure 3:
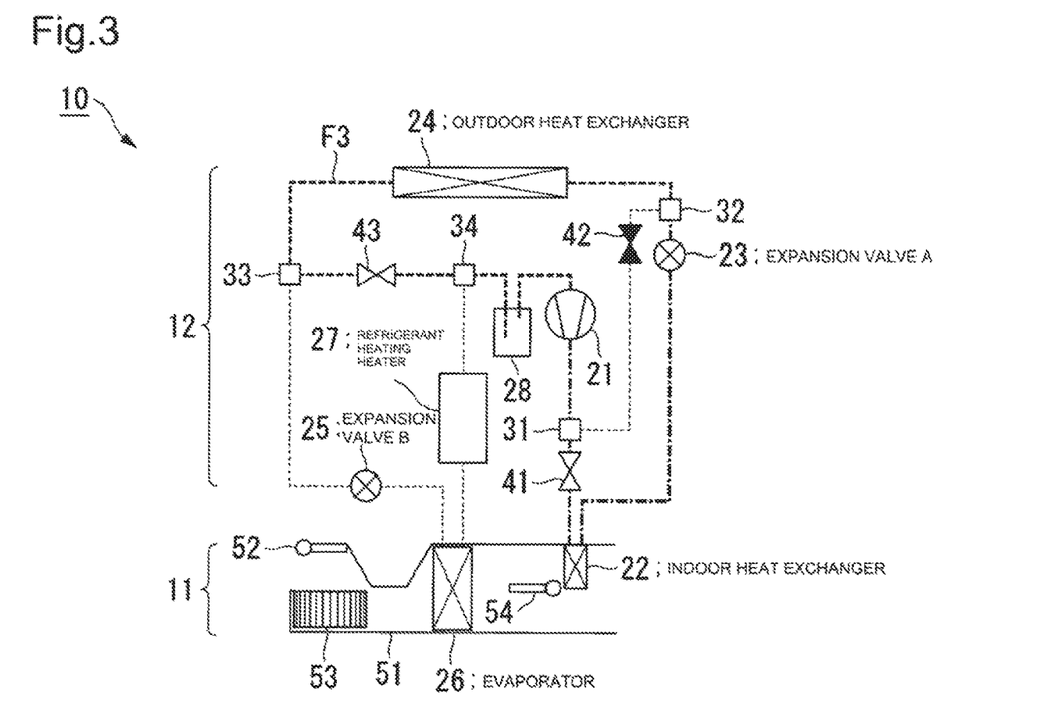
FIG. 3 is diagram showing the heating operation of the air conditioner for the vehicle in accordance with the first embodiment of the present disclosure.

FIGS. 1 to 3 are configuration diagrams of an air conditioner 10 for a vehicle in accordance with an embodiment of the present disclosure. FIG. 1 shows a flow of a refrigerant at the time of dehumidification heating operation. In FIG. 1, a thick line indicates a circulating passage of a refrigerant and a broken line indicates a flow channel through which the refrigerant does not circulate, respectively. FIG. 2 shows the flow of the refrigerant at the time of cooling operation. FIG. 3 shows the flow of the refrigerant at the time of heating operation. Herein, the dehumidification heating operation, the cooling operation and the heating operation may be referred to as a dehumidification heating mode, a cooling mode and a heating mode, respectively.

The air conditioner 10 for the vehicle includes an air conditioning unit 11, a heat pump cycle 12 and a control unit (not shown). The terms "for the vehicle" of the air conditioner 10 for the vehicle means that the air conditioner is suitable for use in the vehicle or that it is used mainly within the vehicle. In other words, the terms "for the vehicle" do not limit the technical scope of the embodiment or the scope of the claims to the use within the vehicle of the air conditioner 10 for the vehicle or to the air conditioner 10 for the vehicle to be used within the vehicle.

The air conditioning unit 11 includes a duct 51, a blower 53, an air mix door 54, an evaporator 26, and an indoor heat exchanger 22. Air-conditioning air circulates inside the duct 51. The duct 51 has an air intake port 52 at one end thereof and an air blow-off port (not shown) at the other end thereof. The blower 53, the evaporator 26, the air mix door 54 and the indoor heat exchanger 22 are arranged in the order named from the upstream side to the downstream side in the circulating direction of the air-conditioning air within the duct. The circulating direction of the air-conditioning air is the direction oriented from the air intake port 52 to the air blow-off port.

The air intake port 52 takes indoor air in. An opening degree of the air intake port 52 is adjusted by control of the control unit. Accordingly, a flow amount of air flowing into the duct 51 is adjusted. Air which has been taken in is introduced into the duct 51 as the air-conditioning air. The air-conditioning air which has circulated within the duct 51 is discharged into a room from the air blow-off port.

The blower 53 sends the air-conditioning air which is taken in from the air intake port 52, to the downstream side, namely, toward the evaporator 26. The blower 53 is operated in accordance with an operation voltage applied from the control unit. A sending amount of the air-conditioning air is controlled by electric power supplied by the operation voltage.

The evaporator 26 performs heat exchange between the refrigerant of low temperature and low pressure which flows thereinto through an expansion valve B 25 (to be referred to later) and the air-conditioning air introduced into the duct 51. The heat of the air-conditioning air which passes through the evaporator 26 is absorbed by the refrigerant when the refrigerant evaporates. Thus, the air-conditioning air passing through the evaporator 26 is cooled. The cooled air-conditioning air is sent so as to be oriented toward the indoor heat exchanger 22 or to go around the indoor heat exchanger 22 through the air mix door 54. The refrigerant in a gas-liquid two phase state composed of the refrigerant of a gas phase vaporized by evaporation and the refrigerant of a liquid phase remaining in a liquid state without evaporation is sent toward a refrigerant heating heater 27 (refrigerant heating means). In the following description, the refrigerant of the gas phase may be referred to as a gas refrigerant, and the refrigerant of the liquid phase may be referred to as a liquid refrigerant.

Further, in the vicinity of the evaporator 26 there is arranged a temperature sensor (not shown). The temperature sensor provided in the evaporator 26 detects the temperature of the evaporator 26 and outputs a detection signal indicating the detected temperature to the control unit. The detection signal from the temperature sensor is used for determining an air conditioning load in accordance with the temperature of the evaporator 26 in the control unit to be referred to later. For example, the rotation frequency of a compressor 21 is controlled as the air conditioning load.

The air mix door 54 is rotatable between a heating position in which a ventilation passage oriented toward the indoor heat exchanger 22 from the evaporator 26 within the duct 51 is opened and a cooling position in which a ventilation passage going around the indoor heat exchanger 22 from the evaporator 26 is opened. The air mix door 54 located in the cooling position blocks the ventilation passage oriented toward the indoor heat exchanger 22. A rotational position of the air mix door 54 is controlled by the control unit between the heating position and the cooling position. By this control, whether or not to allow the air-conditioning air sent from the evaporator 26 to pass through the indoor heat exchanger 22 is controlled, or the ratio of the flow amount between the flow amount of the air-conditioning air which passes through the indoor heat exchanger 22 and the flow amount of the air-conditioning air which goes around the indoor heat exchanger 22 and is discharged into the room from the air blow-off port is adjusted. In the dehumidification heating mode, the rotational position of the air mix door 54 is controlled so as to be in the heating position. Accordingly, the ventilation passage from the evaporator 26 to the indoor heat exchanger 22 is opened, so that the heat of the refrigerant flowing into the indoor heat exchanger 22 is radiated. In the following description, to control the rotational position of the air mix door 54 so as to be in the heating position is referred to as to open the air mix door 54. Moreover, to control such rotational position so as to be in cooling position may be referred to as to close the air mix door 54.

The indoor heat exchanger 22 performs heat exchange between the refrigerant of high temperature and high pressure flowing thereinto through an electromagnetic valve 41 (to be referred to later) and the air-conditioning air passing through the air mix door 54. In the indoor heat exchanger 22, the heat of the refrigerant which flows thereinto is radiated to the air-conditioning air which has a lower temperature. Therefore, the air-conditioning air passing through the indoor heat exchanger 22 is heated. The air-conditioning air passing through the indoor heat exchanger 22 is discharged from the air blow-off port.

Next, the configuration and function of the heat pump cycle 12 will be described mainly with respect to the case in which the operation mode is in the dehumidification heating mode, as an example. The heat pump cycle 12 includes an expansion valve A 23, the outdoor heat exchanger 24, the expansion valve B 25, the refrigerant heating heater 27, an accumulator 28 and the compressor 21 in addition to the evaporator 26 and the indoor heat exchanger 22. The dehumidification heating mode is an operation mode in which the refrigerant is circulated in a dehumidification heating circuit F1. The dehumidification heating circuit F1 includes the indoor heat exchanger 22, the expansion valve A 23, the outdoor heat exchanger 24, the expansion valve B 25, the evaporator 26, the refrigerant heating heater 27, the accumulator 28 and the compressor 21 as component elements and has a series of flow passages formed by having each of the component elements connected in the order named. At the time of dehumidification heating operation, the refrigerant is circulated in the above order.

The compressor 21 is operated by a motor (not shown), such that it inhales the gas refrigerant flowing thereinto from the accumulator 28 and compresses the inhaled gas refrigerant. The compressor 21 sends the refrigerant of high temperature and high pressure generated by compression, through a branching part 31 and the electromagnetic valve 41 to the indoor heat exchanger 22. The motor is operated at a rotational frequency in accordance with the electric power supplied from the control unit.

The branching part 31 has a configuration which is able to branch the refrigerant flowing from the compressor 21 so as to be oriented toward the electromagnetic valve 41 and an electromagnetic valve 42. The electromagnetic valves 41, 42 open and close the flow passage by the control of the control unit. In the dehumidification heating mode, the electromagnetic valve 41 opens the flow passage thereby to allow the refrigerant from the compressor 21 to pass through the flow passage. On the other hand, the electromagnetic valve 42 closes the flow passage thereby to block the refrigerant from the compressor 21.

The expansion valve A 23 expands the refrigerant flowing thereinto from the indoor heat exchanger 22 by reducing the pressure. The opening degree of the expansion valve A 23 is controlled by the control unit. A reduction amount of the pressure of the refrigerant decreases as the opening degree increases, while the reduction amount of the pressure of the refrigerant increases as the opening degree decreases. The atomized refrigerant in a gas-liquid two phase state which has a medium-degree temperature and a medium-degree pressure generated by the reduction of the pressure is sent through the joining part 32 to the outdoor heat exchanger 24. The medium-degree temperature and the medium-degree pressure each are referred to as moderate temperature and moderate pressure.

A joining part 32 has a configuration which is able to join the refrigerant flowing from the expansion valve A 23 and the refrigerant flowing from the electromagnetic valve 42. The joined refrigerant is sent to the outdoor heat exchanger 24. However, in the dehumidification heating mode, since the refrigerant does not flow into the joining part 32 from the electromagnetic valve 42, the refrigerant flowing from the electromagnetic valve A 23 is sent to the outdoor heat exchanger 24.

The outdoor heat exchanger 24 is arranged outside the room. The outdoor heat exchanger 24 performs the heat exchange between the refrigerant flowing thereinto from the joining part 32 and the outside air. When the temperature of the refrigerant in the outdoor heat exchanger 24 is lower than the temperature of the outside air, the refrigerant flowing into the outdoor heat exchanger absorbs the heat of the outside air. The temperature of the refrigerant rises accordingly. When the temperature of the refrigerant in the outdoor heat exchanger 24 is higher than temperature of the outside air, the refrigerant flowing into the outdoor heat exchanger is heat-radiated to the outside air. The refrigerant is cooled accordingly. The heat exchanged refrigerant is sent through a branching part 33 and the expansion valve B 25 to the evaporator 26.

Further, in a neighboring part of the outdoor heat exchanger 24 there is located a temperature sensor (not shown). The temperature sensor located in the neighboring part of the outdoor heat exchanger 24 detects the temperature of the outside air and outputs a detection signal indicating the detected temperature of the outside air to the control unit. The detection signal from the temperature sensor is used for deciding the air-conditioning load in accordance with the temperature of the outside air in the control unit, as being referred to later. As a parameter of the air-conditioning load depending upon the temperature of the outside air, the control unit controls the rotational frequency of the compressor 21, opening-closing operation and the opening degrees of various kinds of valves in the flow passage of the refrigerant in each of the operation modes, or the like, for example.

The branching part 33 has a configuration which is able to branch the refrigerant flowing from the outdoor heat exchanger 24 so as to be oriented to an electromagnetic valve 43 and the expansion valve B 25. The electromagnetic valve 43 opens and closes the flow passage by the control of the control unit. In the dehumidification heating mode, the electromagnetic valve 43 closes the flow passage thereby to block the refrigerant from the outdoor heat exchanger 24. On the other hand, the expansion valve B 25 expands the refrigerant flowing thereinto from the outdoor heat exchanger 24 by reducing the pressure. The opening degree of the expansion valve B 25 is controlled by the control unit. The reduction amount of the pressure of the refrigerant decreases as the opening degree increases, while the reduction amount of the pressure of the refrigerant increases as the opening degree decreases. The refrigerant of low temperature and low pressure generated by the reduction of the pressure is sent to the evaporator 26.

In the example as shown in FIG. 1, the refrigerant heating heater 27 is arranged between the evaporator 26 and a joining part 34 in the dehumidification heating circuit F1. The refrigerant heating heater 27 generates the heat by the electric power supplied from the control unit, thereby to heat the refrigerant flowing from the evaporator 26. The heated refrigerant is sent to the joining part 34. The control unit controls the presence/absence of electric power supply to the refrigerant heating heater 27 and the magnitude of the electric power to be supplied. When the electric power is not supplied to the refrigerant heating heater 27, the refrigerant is sent through the joining part 34 to the accumulator 28 without being heated.

The joining part 34 has a configuration which is able to join the refrigerant flowing from the evaporator 26 through the refrigerant heating heater 27 and the refrigerant flowing from the electromagnetic valve 43. The joined refrigerant is sent to the accumulator 28. However, in the dehumidification heating mode, the refrigerant does not flow into the joint part 34 from the electromagnetic valve 43. Therefore, the refrigerant flowing from the refrigerant heating heater 27 is sent to the accumulator 28.

The accumulator 28 separates the gas refrigerant and the liquid refrigerant from the refrigerant in a gas-liquid two phase state flowing from the joining part 34 and allows the liquid refrigerant to remain therein. The separated gas refrigerant without remaining in the accumulator 28 is fed into the compressor 21.

Accordingly, in the dehumidification heating circuit F1, the temperature of the evaporator 26 is lowered and the temperature of the indoor heat exchanger 22 is raised, when the refrigerant is circulated. Water vapor contained in the air-conditioning air flowing into the duct 51 by operation of the blower 53 is liquefied when it is cooled below a dew point temperature by the evaporator 26. Since the water vapor is liquefied and drops down as a water drop, an amount of the water vapor contained in the air is reduced.

Further, in the dehumidification heating mode, the control unit opens the air mix door 54. The air-conditioning air having the reduced amount of the water vapor by having passed through the evaporator 26 is sent to the indoor heat exchanger 22. The air-conditioning air passing through the indoor heat exchanger 22 is heated thereby to be discharged from the air blow-off port. Therefore, the air-conditioning air is fed into the room as the dehumidification heating without accompanying the temperature drop or in a state that the temperature drop is moderated.

The control unit controls the operation of the air conditioner 10 for the vehicle based on operation signals from various kinds of operation members arranged within the room. The control unit is an electronic control unit (ECU), for example. The operation member receives operation by an operator and generates an operation signal indicating a command corresponding to the operation member. The operation member includes members such as a switch, a lever, a dial and the like, for example. The operation mode, the target temperature and the like are instructed by the operation signal, for example. The target temperature means the targeted blow-off temperature. The blow-off temperature means the temperature of the air-conditioning air to be discharged from the air blow-off port of the duct 51.

When the operation mode is in the dehumidification heating mode, the control unit controls the opening degree of the expansion valve A 23, the opening degree of the expansion valve B 25, and necessity of the electric power supply to the refrigerant heating heater 27. For example, in the case where the temperature of the outside air is low and the blow-off temperature is raised above the blow-off temperature at that point of time, it is required to raise the temperature of the indoor heat exchanger 22. In this case, the heat absorption amount from the outside air to the refrigerant is increased by lowering the temperature of the refrigerant of the outdoor heat exchanger 24. Therefore, the control unit controls the opening degree of the expansion valve B 25 so as to be larger than the opening degree of the expansion valve A 23. With this, the pressure difference between the refrigerant of the outdoor heat exchanger 24 and the refrigerant of the evaporator 26 is decreased, so that the pressure of the evaporator 26 is lowered. Thus, the temperature of the refrigerant of the outdoor heat exchanger 24 is lowered and approaches the temperature of the evaporator 26. However, even if the opening degree of the expansion valve B 25 is opened completely, namely, the opening degree of the expansion valve B 25 is made larger than the opening degree of the expansion valve A 23, the difference between the temperature of the refrigerant in the outdoor heat exchanger 24 and the temperature of the outside air is decreased when the temperature of the outside air is low. In that case, since the heat absorption amount from the outside air to the refrigerant in the outdoor heat exchanger is lowered, the blow-off temperature is not raised sufficiently.

Therefore, the control unit supplies the electric power to the refrigerant heating heater 27 when the temperature of the outside air is not higher than a predetermined temperature (for example, zero degrees centigrade) and the opening degree of the expansion valve B 25 is larger than the opening degree of the expansion valve A 23. The refrigerant heating heater 27 heats the refrigerant thereby to facilitate the evaporation of the refrigerant, whereby the volume of the refrigerant is increased. Then, the control unit increases the rotational frequency of the compressor 21, so that the flow amount of the refrigerant in the dehumidification heating circuit F1 is increased. In this way, the heat absorption amount in the outdoor heat exchanger 24 can be increased. Consequently, the temperature of the indoor heat exchanger 22 rises up, and the blow-off temperature of the air-conditioning air which passes through and is discharged from the indoor heat exchanger 22 is raised. More specifically, the control unit controls the rotational frequency of the compressor 21 such that the pressure of the evaporator 26 becomes not less than an evaporator freezing limit temperature saturation vapor pressure. The evaporator freezing limit temperature saturation vapor pressure means a saturation vapor pressure of the refrigerant at a freezing limit temperature of the evaporator 26.

Further, the control unit makes the opening degree of the expansion valve A 23 larger than that before the electric power is supplied to the refrigerant heating heater 27. In the refrigerant heating heater 27, the volume of the refrigerant evaporated by heating the refrigerant is increased. The control unit makes the rotational frequency of the compressor 21 higher as the opening degree of the expansion valve A 23 is increased. With this, in the dehumidification heating circuit F1, the circulation of the increased refrigerant is facilitated. Accordingly, since the heat absorption amount of the refrigerant in the outdoor heat exchanger 24 is further increased, the blow-off temperature of the air-conditioning air can be further raised.

Next, the function of the heat pump cycle 12 will be described while referring to FIG. 2 with respect to the case in which the operation mode is in the cooling mode, as an example. In the following description, the difference from the case in which the operation mode is in the dehumidification heating mode will be mainly described.

The cooling mode is the operation mode for allowing the refrigerant to be circulated in a cooling circuit F2. The cooling circuit F2 includes the outdoor heat exchanger 24, the expansion valve B 25, the evaporator 26, the accumulator 28 and the compressor 21 as the component elements, and has a series of flow passages formed by having each of the component elements connected in the order named. In the cooling circuit F2, the refrigerant is circulated in the above order.

In the cooling mode, the flow passages of each of the electromagnetic valve 41 and the expansion valve A 23 are closed by the control of the control unit. On the other hand, the flow passage of the electromagnetic valve 42 is opened by the control of the control unit. The refrigerant of higher temperature and higher pressure than the outside air flows into the outdoor heat exchanger 24 through the branching part 31, the electromagnetic valve 42 and the joining part 32 from the compressor 21.

In the outdoor heat exchanger 24, the heat of the refrigerant of high temperature flowing into the outdoor heat exchanger from the compressor 21 is radiated to the outside air. With this, the refrigerant is cooled. Also in the cooling mode, the electromagnetic valve 43 closes the flow passage by the control of the control unit. Accordingly, the refrigerant heat-radiated in the outdoor heat exchanger 24 is sent through the branching part 33 to the expansion valve B 25.

The expansion valve B 25 expands the refrigerant flowing thereinto from the outdoor heat exchanger 24 by reducing the pressure. The refrigerant of low temperature and low pressure generated by the reduction of the pressure is sent to the evaporator 26.

In the cooling mode, the electric power is not supplied to the refrigerant heating heater 27. The refrigerant flowing into the refrigerant heating heater 27 from the evaporator 26 passes through the refrigerant heating heater 27 without being heated. The refrigerant is sent from the refrigerant heating heater 27 through the joining part 34 to the accumulator 28. In addition, the control unit closes the air mix door 54.

Accordingly, in the cooling circuit F2, the temperature of the evaporator 26 is lowered when the refrigerant is circulated, while the temperature of the indoor heat exchanger 22 is not raised. The air-conditioning air having flown into the duct 51 is cooled by the evaporator 26 and discharged while going around the indoor heat exchanger 22. Therefore, the discharged air-conditioning air is supplied for the purpose of cooling.

Next, the function of the heat pump cycle 12 will be described while referring to FIG. 3 with respect to the case in which the operation mode is in the heating mode, as an example. In the following description, the difference from the case in which the operation mode is in the dehumidification heating mode will be mainly described.

The heating mode is the operation mode for allowing the refrigerant to be circulated in a heating circuit F3. The heating circuit F3 includes the expansion valve A 23, the outdoor heat exchanger 24, the accumulator 28 and the compressor 21 as the component elements, and has a series of flow passages formed by having each of the component elements connected in the order named. In the heating circuit F3, the refrigerant is circulated in the above order.

In the heating mode, the electromagnetic valve 41 and the expansion valve A 23 each open the flow passages by the control of the control unit. On the other hand, the electromagnetic valve 42 closes the flow passage by the control of the control unit. Therefore, the refrigerant of high temperature and high pressure sent from the compressor 21 flows into the indoor heat exchanger 22 through the branching part 31, the electromagnetic valve 42 and the electromagnetic valve 41.

The expansion valve A 23 expands the refrigerant flowing thereto from the indoor heat exchanger 22 by reducing the pressure. The refrigerant of low temperature and low pressure generated by the reduction of the pressure is sent to the outdoor heat exchanger 24 through the joining part 32.

In the outdoor heat exchanger 24, the refrigerant of low temperature flowing from the compressor 21 absorbs the heat of the outside air which has a higher temperature. Consequently, the refrigerant is heated. In the heating mode, the electromagnetic valve 43 is controlled so as to open the flow passage. On the other hand, the expansion valve B 25 closes the flow passage by the control of the control unit. Therefore, the refrigerant having absorbed the heat in the outdoor heat exchanger 24 is sent to the accumulator 28 through the branching part 33, the electromagnetic valve 43 and the joining part 34. In addition, the control unit opens the air mix door 54.

Accordingly, in the heating circuit F3, the temperature of the indoor heat exchanger 22 is raised when the refrigerant is circulated, while the temperature of the evaporator 26 is not lowered. The air-conditioning air having flown into the duct 51 is heated and discharged in the process of passing through the indoor heat exchanger 22 without being cooled by the evaporator 26. The discharged air-conditioning air is supplied for the purpose of heating.

Modified Example

Figure 4:
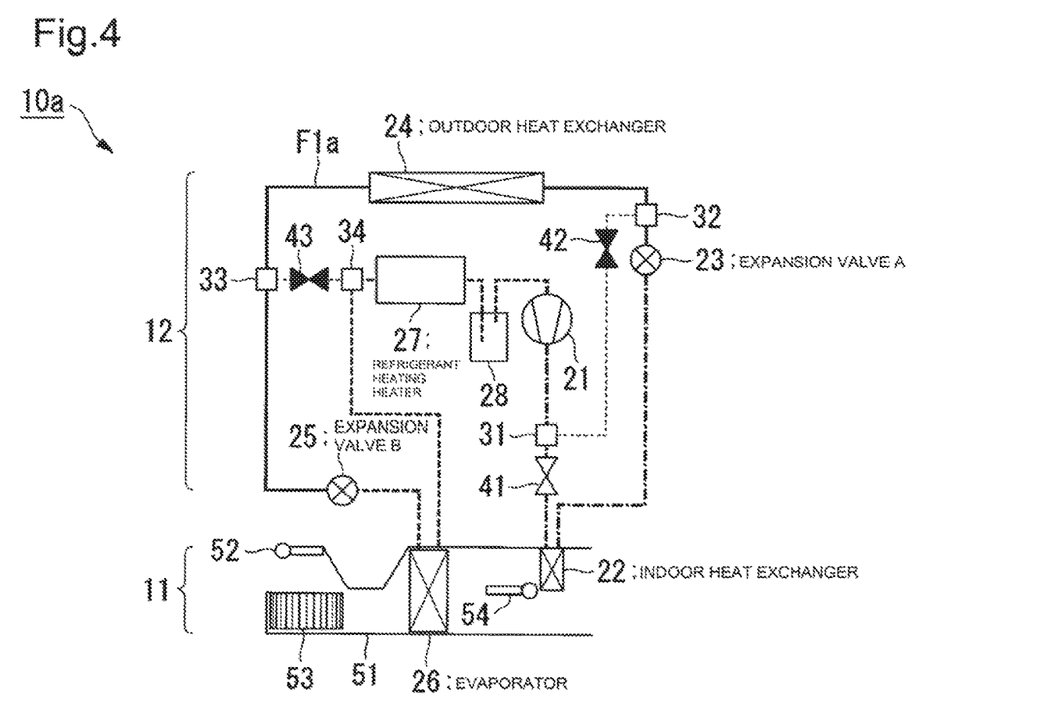
FIG. 4 is a diagram showing the air conditioner for the vehicle in accordance with a second embodiment of the present disclosure.

Although the air conditioner 10 for the vehicle illustrated in FIGS. 1 to 3 has the refrigerant heating heater 27 arranged between the evaporator 26 and the joining part 34 which forms the dehumidification heating circuit F1, the arrangement of the refrigerant heating heater 27 is not limited to this example. Like an air conditioner 10a for a vehicle as shown in FIG. 4, the refrigerant heating heater 27 may be arranged between the joining part 34 and the accumulator 28. The component elements of the air conditioner 10a for the vehicle are equal to those of the air conditioner 10 for the vehicle. A dehumidification heating circuit F1a of the air conditioner 10a for the vehicle includes the indoor heat exchanger 22, the expansion valve A 23, the outdoor heat exchanger 24, the expansion valve B 25, the refrigerant heating heater 27, the accumulator 28 and the compressor 21 as the component elements, and these component elements each are connected in the order named. Herein, in a similar way to the air conditioner 10 for the vehicle, the refrigerant heating heater 27 is arranged between the evaporator 26 and the accumulator 28. Therefore, also in the air conditioner 10a for the vehicle, the same temperature control as the air conditioner 10 for the vehicle can be performed.

Figure 5:
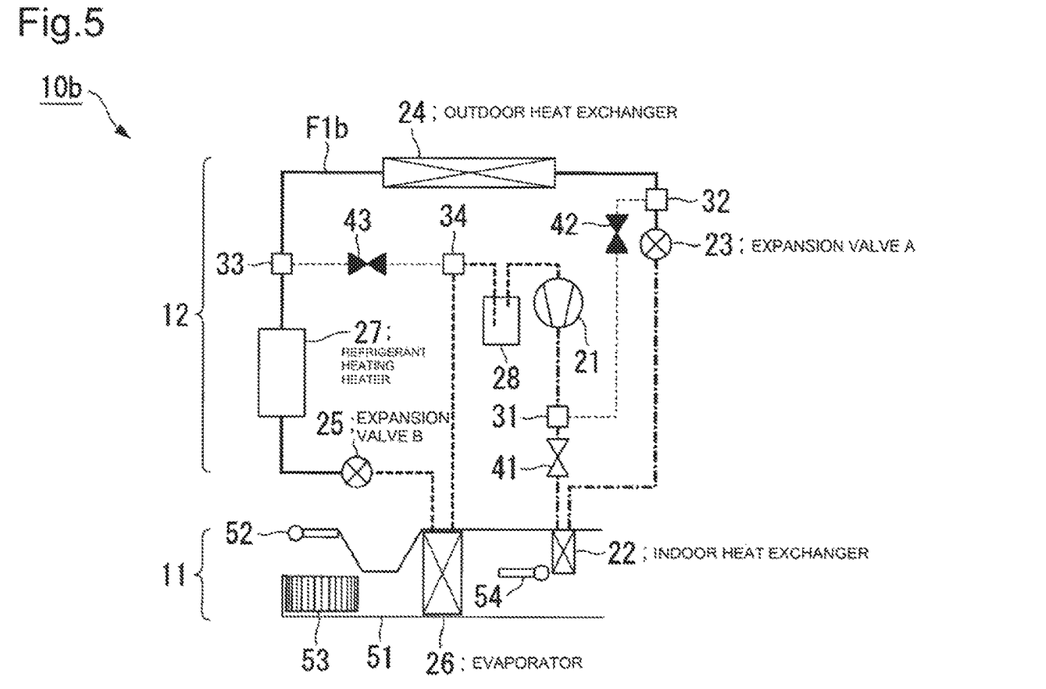
FIG. 5 is a diagram showing the air conditioner for the vehicle in accordance with a third embodiment of the present disclosure.

Like an air conditioner 10b for a vehicle as illustrated in FIG. 5, the refrigerant heating heater 27 may be arranged between the branching part 33 and the expansion valve B 25. A dehumidification heating circuit F1b of the air conditioner 10b for the vehicle includes the indoor heat exchanger 22, the expansion valve A 23, the outdoor heat exchanger 24, the refrigerant heating heater 27, the expansion valve B 25, the accumulator 28 and the compressor 21 as the component elements, and these component elements each are connected in the order named. When the electric power is supplied to the refrigerant heating heater 27, by the control unit, the refrigerant sent from the refrigerant heating heater 27 is raised in temperature. The evaporation of the refrigerant is facilitated by the rise in temperature, so that the volume of the refrigerant is increased.

However, the refrigerant sent from the refrigerant heating heater 27 in the air conditioner 10b for the vehicle is cooled since the evaporation heat is used in the process of evaporation in the evaporator 26. The increase in volume of the refrigerant is suppressed by cooling, whereby to experience the pressure loss. Therefore, the circulation amount of the refrigerant within the dehumidification heating circuit F1b is not able to be increased so much as the air conditioners 10, 10a for the vehicle by increasing the rotational frequency of the compressor 21. Further, the temperature of the evaporator 26 is required to be kept above the freezing limit temperature (for example, zero degrees centigrade). This also serves as the cause that the temperature of the evaporator 26 is not able to be lowered further by increasing the circulation amount of the refrigerant in the dehumidification heating circuit F1b by increasing the rotational frequency of the compressor 21. Accordingly, the air conditioner 10b is not able to raise the temperature of the indoor heat exchanger 22 so as to raise the blow-off temperature of the air-conditioning air passing through the indoor heat exchanger 22 so much as the air conditioners 10, 10a for the vehicle shown in FIGS. 1 and 4.

Figure 6:
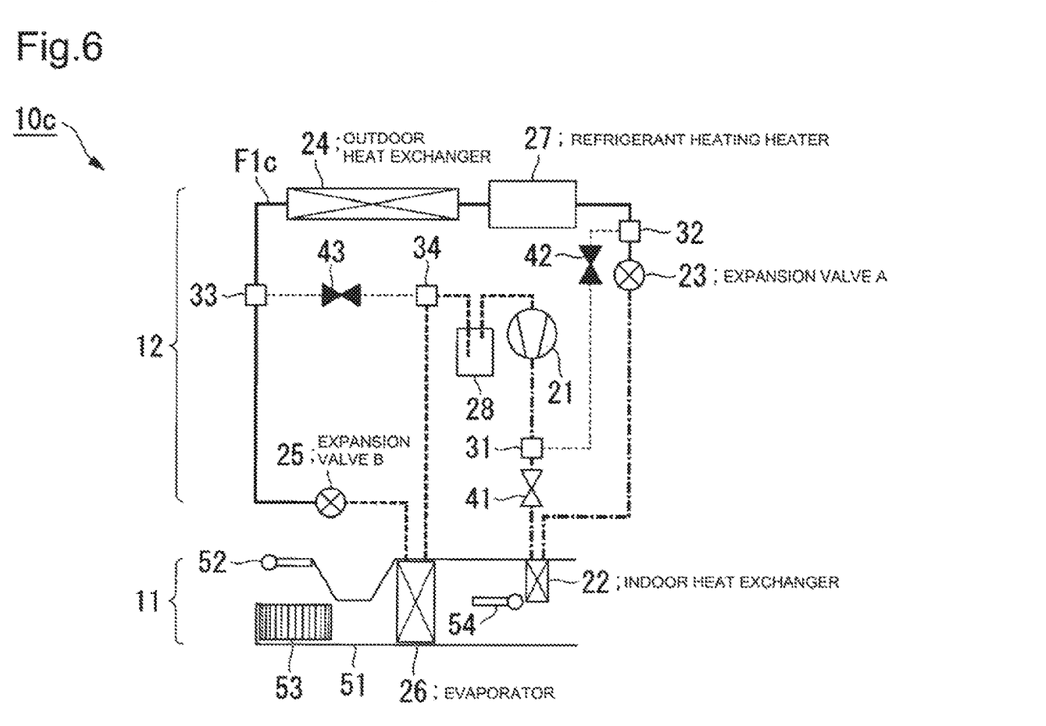
FIG. 6 is a diagram showing the air conditioner for the vehicle in accordance with a fourth embodiment of the present disclosure.

The refrigerant heating heater 27 may be arranged between the joining part 32 and the outdoor heat exchanger 24, like an air conditioner 10c of the a vehicle as illustrated in FIG. 6. A dehumidification heating circuit F1c of the air conditioner 10c for the vehicle includes the indoor heat exchanger 22, the expansion valve A 23, the refrigerant heating heater 27, the outdoor heat exchanger 24, the expansion valve B 25, the accumulator 28 and the compressor 21 as the component elements, and these component elements each are connected in the order named. When the opening degree of the expansion valve B 25 is made larger than that of the expansion valve A 23 by the control unit, the temperature of the outdoor heat exchanger 24 comes closer to the temperature of the expansion valve B 25 than the indoor heat exchanger 22. In this condition, when the electric power is supplied to the refrigerant heating heater 27, the refrigerant sent from the refrigerant heating heater 27 is raised in temperature. The evaporation of the refrigerant is facilitated by the rise in temperature, so that the volume of the refrigerant is increased. Then, the circulation of the refrigerant in the dehumidification heating circuit F1c becomes active when the rotational frequency of the compressor 21 is increased. Thus, the flow amount of the refrigerant flowing into the outdoor heat exchanger 24 is increased, so that the temperature of the outdoor heat exchanger 24 can be lowered. Since, due to this drop in temperature, the difference in temperature from the outside temperature is increased, the heat absorption amount to the refrigerant passing through the outdoor heat exchanger 24 from the outside air is increased. Therefore, the refrigerant flowing into the indoor heat exchanger 22 from the compressor 21 can be raised in temperature. Accordingly, the blow-off temperature of the air-conditioning air passing through the indoor heat exchanger 22 is raised.

The refrigerant which is heated in the refrigerant heating heater 27 of the air conditioner 10c for the vehicle is sent through the outdoor heat exchanger 24 and the expansion valve B 25 to the evaporator 26. The refrigerant flowing into the evaporator 26 experiences the pressure loss although not so much as the air conditioner 10b for the vehicle shown in FIG. 5. Therefore, the circulation of the refrigerant in the dehumidification heating circuit F1c is not facilitated so much as the air conditioners 10, 10a for the vehicle as shown in FIGS. 1 and 4. Accordingly, the blow-off temperature of the air-conditioning air discharged through the indoor heat exchanger 22 is not raised so much as the air conditioners 10, 10a for the vehicle.

Figure 7:
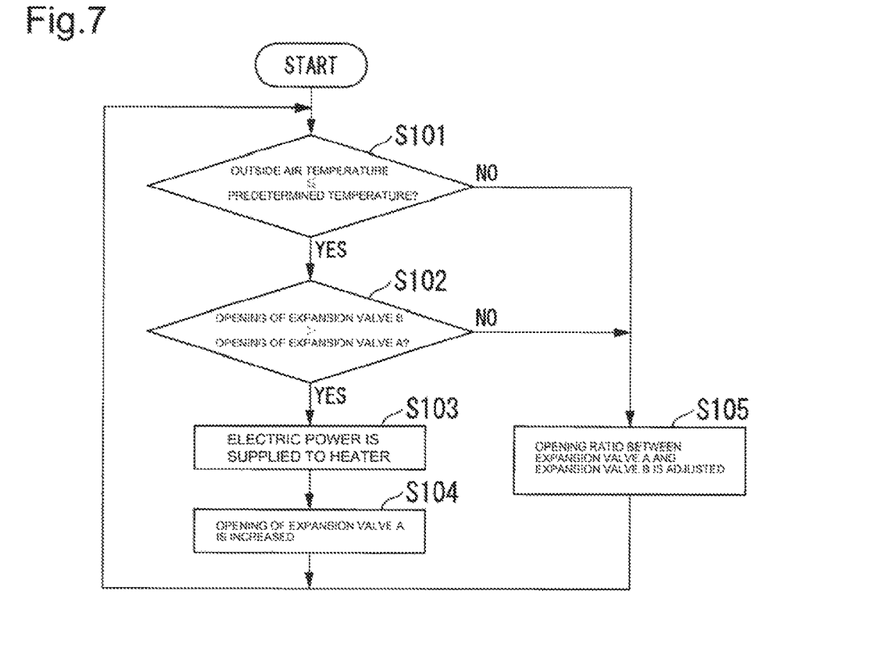
FIG. 7 is a flow chart showing an example of a process of air conditioning control in accordance with the embodiment of the present disclosure.

Next, the air conditioning control in accordance with the embodiment of the present disclosure will be described. FIG. 7 is a flow chart showing a process of air conditioning control in accordance with the embodiment of the present disclosure. The process indicated in FIG. 7 is common to the air conditioners 10, 10a, 10b, 10c for the vehicle in the case where the operation mode is in the dehumidification mode.

(Step S101) The control unit determines whether or not the temperature of the outside air is not higher than a predetermined temperature. When it is determined that it is not higher than the predetermined temperature (Step S101: YES), processing proceeds to Step S102. When it is determined that it is higher than the predetermined temperature (Step S101: NO), processing proceeds to Step S105.

(Step S102) The control unit determines whether or not the opening degree of the expansion valve B 25 is larger than the opening degree of the expansion valve A 23. When it is determined that it is larger than the opening degree of the expansion valve A 23 (Step S102: YES), processing proceeds to Step S103. When it is determined that it is not larger than the opening degree of the expansion valve A 23 (Step S102: NO), processing proceeds to Step S105.

(Step S103) The control unit supplies the electric power to the refrigerant heating heater 27 thereby to heat the refrigerant flowing into the refrigerant heating heater 27. Thereafter, processing proceeds to Step S104.

(Step S104) The control unit increases the opening degree of the expansion valve A 23. Thereafter, processing returns to Step S101.

(Step S105) The control unit adjusts the opening ratio between the expansion valve A 23 and the expansion valve B 25. In the control unit, there may be provided a control table which is configured in advance by associating the information on the outside air temperature and the target temperature with the information on the opening ratio. The control unit refers to the control table and identifies the opening ratio corresponding to the detected outside air temperature and the configured target temperature, so that the opening degree of the expansion valve A 23 and the opening degree of the expansion valve B 25 are controlled by the identified opening ratio. Thereafter, processing returns to Step S101.

Next, with respect to the operation of the air conditioners 10a, 10b for the vehicle by way of example, the operation before and after the electric power is supplied to the refrigerant heating heater 27 will be described by using FIGS. 8 through 12.

Figure 8:
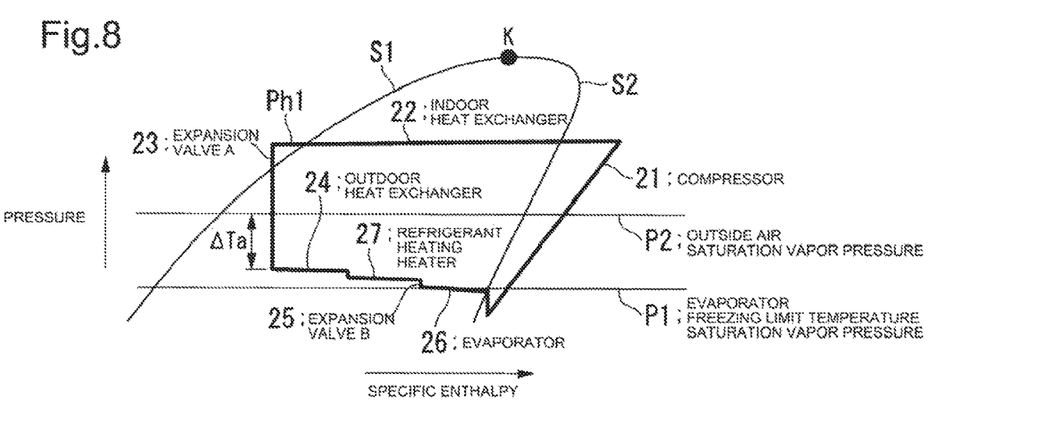
FIG. 8 is an example of a pressure-enthalpy (p-h) diagram at the time of dehumidification heating operation of the air conditioner for the vehicle in accordance with the third embodiment of the present disclosure.

FIG. 8 shows an example of a pressure-enthalpy (p-h) diagram at the time of dehumidification heating operation of the air conditioner 10b for the vehicle (FIG. 5) in accordance with the embodiment of the present disclosure. The p-h diagram Ph1 indicates transitions of the pressure and the specific enthalpy of the refrigerant flowing through each of the component elements of the dehumidification heating circuit F1b (FIG. 5). However, in the example as shown in FIG. 8, the electric power is not supplied to the refrigerant heating heater 27. Under such condition, the transitions of the pressure and the specific enthalpy of the refrigerant indicated in the p-h diagram Ph1 become substantially common to the air conditioners 10, 10a, 10c for the vehicle. Curved lines S1, S2 indicate a saturated liquid line and a saturated vapor line of the refrigerant, respectively. The curved lines S1, S2 indicate a critical point K of the refrigerant. The curved lines S1, S2 are connected at the critical point K, and the pressure on the curved line becomes a local maximum. P1 and P2 indicate the evaporator freezing limit temperature saturation vapor pressure and an outside air temperature saturation vapor pressure, respectively. The outside air temperature saturation vapor pressure P2 means the saturation vapor pressure of the refrigerant at the temperature of the outside air. In the example as shown in FIG. 8, it is assumed that the temperature of the outside air is higher than the evaporator freezing limit temperature. Accordingly, the outside air temperature saturation vapor pressure P2 is higher than the evaporator freezing limit temperature saturation vapor pressure P1.

In the indoor heat exchanger 22, the heat of the refrigerant flowing thereinto from the compressor 21 is radiated to the air-conditioning air. In this process, the refrigerant circulating through the compressor 21 is condensed, and the specific enthalpy decreases. Thereafter, in the expansion valve A 23, the refrigerant flowing thereinto from the indoor heat exchanger 22 is expanded. In this process, the pressure of the expanded refrigerant is lowered and the temperature is lowered. In the outdoor heat exchanger 24, the refrigerant flowing thereinto from the expansion valve A 23 absorbs the heat of the outside air. In this process, the specific enthalpy of the refrigerant passing through the outdoor heat exchanger 24 is raised. The pressure of the refrigerant is lowered by flowing out from the outdoor heat exchanger 24. The refrigerant flowing into the refrigerant heating heater 27 from the outdoor heat exchanger 24 absorbs the heat of component elements of the refrigerant heating heater 27. Since the electric power is not supplied to the refrigerant heating heater 27, the specific enthalpy of the refrigerant passing through the refrigerant heating heater 27 in this process is raised, while the pressure is not significantly changed. The pressure of the refrigerant is further lowered by flowing out from the refrigerant heating heater 27. In the expansion valve B 25, the refrigerant flowing thereinto from the refrigerant heating heater 27 is expanded. In this process, the pressure of the expanded refrigerant is lowered and the temperature is lowered. In the evaporator 26, the refrigerant flowing thereinto from the expansion valve B 25 is evaporated. In this process, since the refrigerant absorbs the heat from the air-conditioning air which passes through the evaporator 26, the specific enthalpy increases. The pressure of the refrigerant is further lowered by flowing out from the evaporator 26. Then, the compressor 21 insulates from heat and compresses the refrigerant flowing thereinto from the evaporator 26 through the accumulator 28. In this process, both of the specific enthalpy and the pressure of the refrigerant are raised. Herein, in FIG. 8, $\Delta Ta$ designates the temperature difference between the temperature of the outside air and the temperature of the evaporator.

Figure 9:
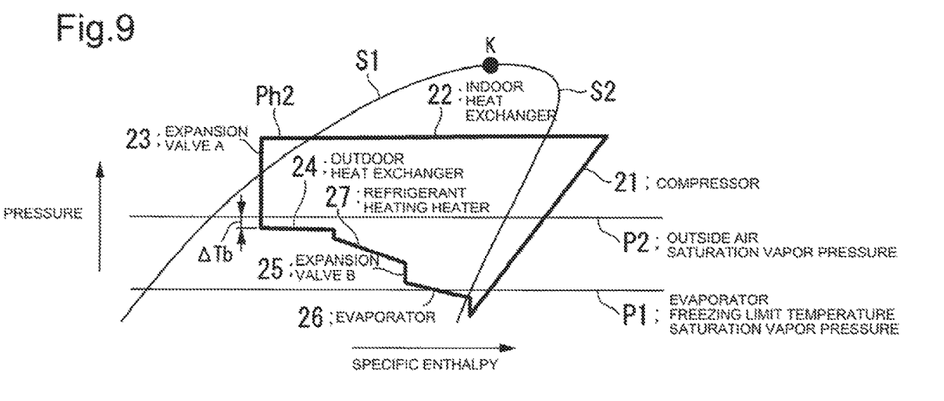
FIG. 9 is another example of the p-h diagram at the time of dehumidification heating operation of the air conditioner for the vehicle in accordance with the third embodiment of the present disclosure.
Figure 11:
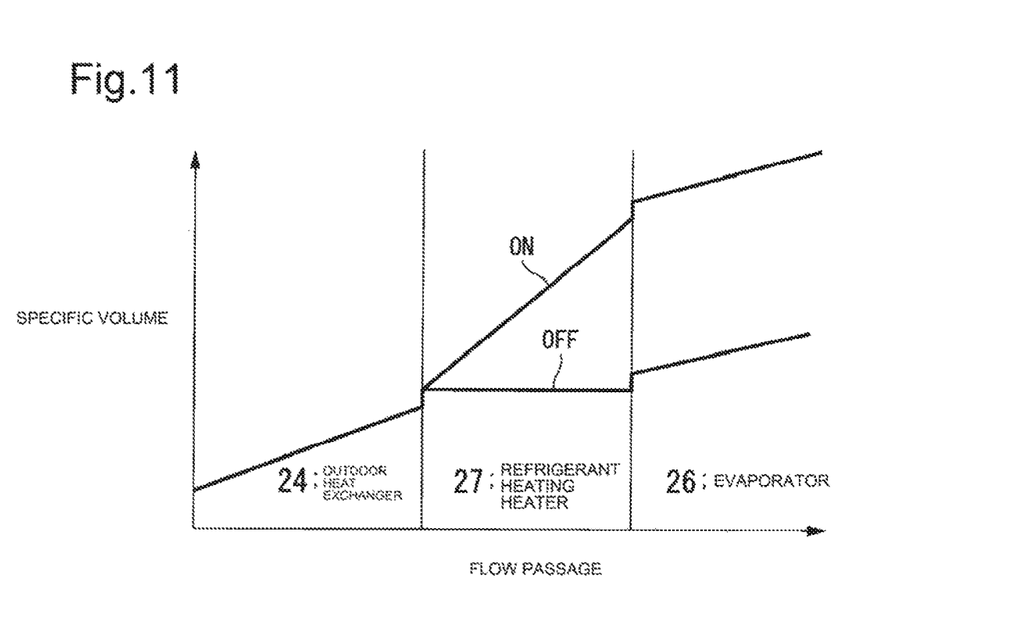
FIG. 11 is a diagram showing an example of specific volume of a refrigerant of the air conditioner for the vehicle in accordance with the third embodiment of the present disclosure.

FIG. 9 shows another example of the p-h diagram at the time of dehumidification heating operation of the air conditioner 10b for the vehicle (FIG. 5) in accordance with the embodiment of the present disclosure. The p-h diagram Ph2 indicates transitions of the pressure and the specific enthalpy of the refrigerant circulating through each of the component elements of the dehumidification heating circuit F1b (FIG. 5). In the example as shown in FIG. 9, the electric power is supplied to the refrigerant heating heater 27. The refrigerant flowing into the refrigerant heating heater 27 from the outdoor heat exchanger 24 is heated, so that the evaporation of the refrigerant is facilitated accompanying the rise in temperature in the process of passing through the refrigerant heating heater 27. Therefore, the specific volume of the refrigerant is increased as compared with the case where the electric power is not supplied to the refrigerant heating heater 27 (FIG. 11, ON/OFF). This increase in specific volume means an increase in volume. As shown in FIG. 9, in the process in which the refrigerant passes through the refrigerant heating heater 27 to which the electric power is supplied, the specific enthalpy increases accompanying the drop in pressure. The refrigerant having passed through the refrigerant heating heater 27 is sent through the expansion valve B 25 to the evaporator 26. The refrigerant flowing into the evaporator 26 requires evaporation heat in the process of evaporation and so is cooled. Therefore, the increase in volume of the refrigerant is suppressed thereby to experience the pressure loss. In addition, the increase in flow amount of the refrigerant in the dehumidification heating circuit F1b is suppressed.

Further, the temperature of the evaporator 26 is required to be maintained at a higher temperature than the evaporator freezing limit temperature. On the other hand, since the pressure of the refrigerant in the evaporator 26 is lowered more than the refrigerant sent out from the compressor 21 when the rotational frequency of the compressor 21 is increased, the temperature of the evaporator 26 is lowered as a result. Therefore, the control unit is required to control the rotational frequency of the compressor 21 so as to be below the rotational frequency at which the temperature of the evaporator 26 presents the evaporator freezing limit temperature. According to this control, there may be cases where the temperature of the outdoor heat exchanger 24 is not able to be lowered so much as the temperature before the electric power is supplied to the refrigerant heating heater 27. Accordingly, the temperature difference $\Delta Tb$ between the refrigerant heating heater 27 after the electric power is supplied to the refrigerant heating heater 27 and the temperature of the outside air becomes smaller than the temperature difference $\Delta Ta$, so that the heat absorption amount from the outside air to the refrigerant in the outdoor heat exchanger 24 is diminished. Since the rise in temperature of the indoor heat exchanger 22 is suppressed, the rise in blow-off temperature of the air-conditioning air which passes through and is discharged from the indoor heat exchanger 22 is also suppressed.

Figure 10:
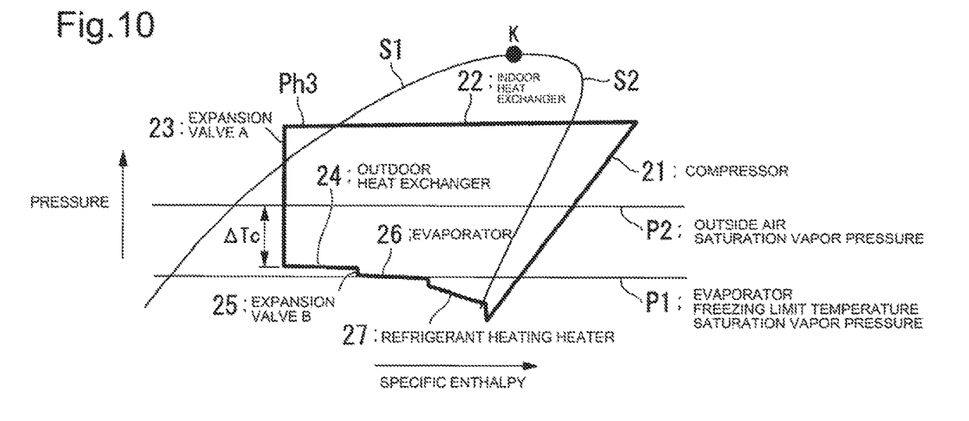
FIG. 10 is an example of the p-h diagram at the time of dehumidification heating operation of the air conditioner for the vehicle in accordance with the second embodiment of the present disclosure.
Figure 12:
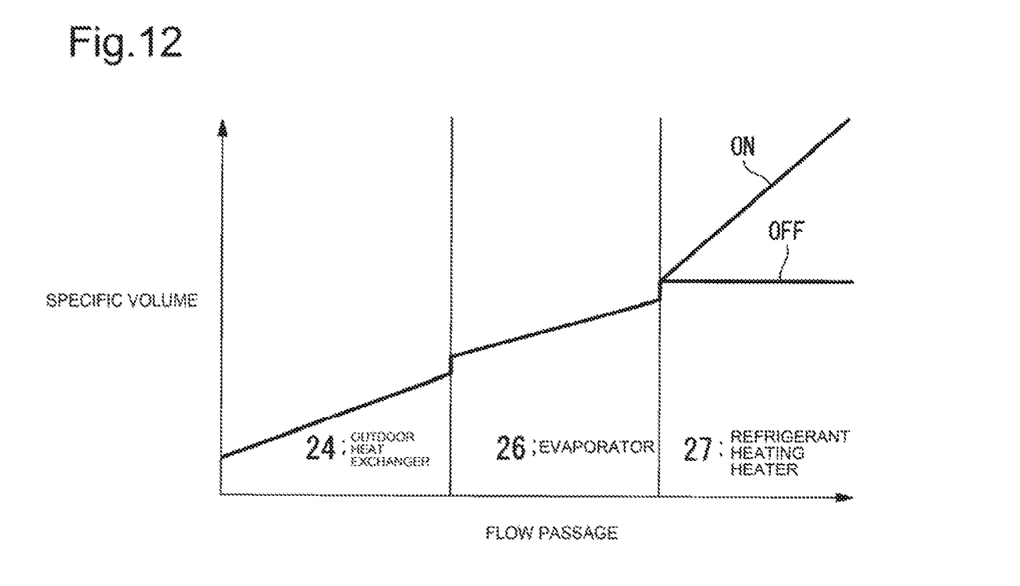
FIG. 12 is a diagram showing an example of the specific volume of the refrigerant of the air conditioner for the vehicle in accordance with the second embodiment of the present disclosure.

FIG. 10 is an example of the p-h diagram at the time of dehumidification heating operation of the air conditioner 10a for the vehicle (FIG. 4) in accordance with the embodiment of the present disclosure. The p-h diagram Ph3 indicates transitions of the pressure and the specific enthalpy of the refrigerant circulating through each of the component elements of the dehumidification heating circuit F1a (FIG. 4). In the example as shown in FIG. 10, the electric power is supplied to the refrigerant heating heater 27. The refrigerant flowing into the refrigerant heating heater 27 from the evaporator 26 is facilitated in evaporation accompanying the rise in temperature in the process of passing through the refrigerant heating heater 27. Therefore, the specific volume of the refrigerant is increased as compared with the case where the electric power is not supplied to the refrigerant heating heater 27 (FIG. 12, ON/OFF). As shown in FIG. 10, in the process in which the refrigerant passes through the refrigerant heating heater 27, the specific enthalpy increases accompanying the drop in pressure. The gas refrigerant of the refrigerant having passed through the refrigerant heating heater 27 is supplied through the accumulator 28 to the compressor 21. In the example as shown in FIG. 10, the refrigerant heating heater 27 is arranged on the downstream side of the evaporator 26 in the circulating direction of the refrigerant. Accordingly, the refrigerant which is more increased in volume by heating than that before being heated is supplied to the compressor 21 without experiencing the pressure loss in the evaporator 26 (FIG. 12).

Therefore, since the flow amount of the refrigerant in the dehumidification heating circuit F1a is more increased than the air conditioner 10b for the vehicle (FIG. 5) by increasing the rotational frequency of the compressor 21, the heat absorption amount from the outside air to the refrigerant in the outdoor heat exchanger 24 can be increased. Further, the pressure difference between the outdoor heat exchanger 24 and the evaporator 26 can be suppressed when the opening degree of the expansion valve B 25 is made larger than the opening degree of the expansion valve A 23. Consequently, the temperature of the outdoor heat exchanger 24 is lowered. When the temperature of the evaporator 26 exceeds the evaporator freezing limit temperature, the temperature of the outdoor heat exchanger 24 can be more lowered by the control unit than the examples as shown in FIGS. 8 and 9 by increasing the rotational frequency of the compressor 21. Due to this drop in temperature, the temperature difference $\Delta Tc$ between the refrigerant heating heater 27 and the temperature of the outside air after the electric power is supplied to the refrigerant heating heater 27 becomes larger than the temperature differences $\Delta Ta$, $\Delta Tb$. Accordingly, the heat absorption amount from the outside air to the refrigerant in the outdoor heat exchanger 24 can be increased further. In addition, since the temperature of the indoor heat exchanger 22 is raised, the blow-off temperature of the air-conditioning air which passes through and is discharged from the indoor heat exchanger 22 is heightened.

As described above, the air conditioner for the vehicle (for example, the air conditioner 10, 10a, 10b, 10c for the vehicle) according to the embodiment of the present disclosure, comprises the compressor (for example, the compressor 21), a first heat exchanger (for example, the indoor heat exchanger 22), a first expansion valve (for example, the expansion valve A 23), a second heat exchanger (for example, the outdoor heat exchanger 24), a second expansion valve (for example, the expansion valve B 25), and the evaporator (for example, the evaporator 26), and the air conditioner for the vehicle is operated in any operation mode of a heating mode, a cooling mode and a dehumidification heating mode. The compressor compresses the refrigerant. The first heat exchanger is capable of radiating heat of the refrigerant compressed by the compressor into air. The first expansion valve expands the refrigerant flowing out from the first heat exchanger. The second heat exchanger is capable of heat exchanging the refrigerant flowing out from the first expansion valve and outside air. The second expansion valve expands the refrigerant flowing out from the second heat exchanger. The evaporator allows the refrigerant flowing out from the second expansion valve to absorb heat of air. The heating mode is the operation mode in which the refrigerant is circulated through the heating circuit (for example, the heating circuit F3) comprising the first heat exchanger, the second heat exchanger and the compressor in the order named so as to radiate the heat of the refrigerant into the first heat exchanger and to allow the refrigerant to absorb the heat in the second heat exchanger. The cooling mode is the operation mode in which the refrigerant is circulated through the cooling circuit (for example, the cooling circuit F2) comprising the second heat exchanger, the evaporator and the compressor in the order named so as to radiate the heat of the refrigerant to the first heat exchanger. The dehumidification heating circuit is provided with a refrigerant heating means (for example, the refrigerant heating heater 27) capable of heating the refrigerant. When the operation mode is in the dehumidification heating mode and the outside air temperature is not higher than the predetermined temperature, the opening degree of the second expansion valve is made larger than the opening degree of the first expansion valve, and the refrigerant heating means heats the refrigerant.

With the above configuration, in the case where the operation mode is in the dehumidification heating mode, since the refrigerant is heated thereby to increase in specific volume when the temperature of the outside air is low, the circulation of the refrigerant in the dehumidification heating circuit can be facilitated. Since the heated refrigerant is increased in volume by evaporation and the volume of the compressed refrigerant sent out from the compressor is increased, the first heat exchanger can be raised in temperature. Accordingly, the temperature of air-conditioning air obtained by heat radiation of the first heat exchanger is raised. Thus, the temperature control in a wider range can be achieved as compared with the air conditioner for the vehicle which has a conventional dehumidification heating circuit which is not provided with the refrigerant heating means. Since this temperature control is able to be realized without switching a plurality of circulation circuits of the refrigerant which is provided in the air conditioner 92 for the vehicle as shown in FIG. 14. In other words, the temperature control in the wide range can be realized by a simple system configuration and the generation of a circulation sound accompanying the switching of the circulation circuits can be avoided.

Further, in the air conditioner for the vehicle (for example, the air conditioner 10, 10*a*, 10*b*, 10*c* for the vehicle), when the refrigerant heating means heats the refrigerant, the opening degree of the first expansion valve is more increased than the opening degree before the refrigerant is heated.

With this configuration, the circulation of the refrigerant can be facilitated by heating in the dehumidification heating circuit. Therefore, the temperature difference between the first heat exchanger and the second heat exchanger is more increased than the case where the opening degree of the first expansion valve is maintained, whereby the temperature of the first heat exchanger can be raised. Thus, the temperature can be controlled in a wide range.

Further, in the air conditioner for the vehicle (for example, the air conditioner 10, 10*a* for the vehicle), the accumulator (for example, the accumulator 28) for separating the gas phase component of the refrigerant and supplying the gas phase component to the compressor is provided between the evaporator and the compressor. The refrigerant heating means is located between the evaporator and the accumulator.

With the above configuration, the refrigerant heating means is located in the circulating direction of the refrigerant from the evaporator. Therefore, the refrigerant which is increased in specific volume to be obtained by heating does not experience pressure loss in the evaporator, so that the rotational frequency of the compressor can be increased until the temperature of the refrigerant passing through the refrigerant heating means is lowered below the temperature of the evaporator. Consequently, the circulation amount of the refrigerant in the dehumidification heating circuit is increased, so that the radiation amount to the air-conditioning air in the first heat exchanger can be increased. Further, since the pressure difference between the second heat exchanger and the evaporator is not increased, the temperature of the second heat exchanger can be lowered. Therefore, the heat absorption amount from the outside air in the second heat exchanger can be increased. Thus, the temperature can be controlled in a wider range.

Furthermore, a part of the control unit in the above referred embodiments may be configured so as to be realized by a computer. In this case, a program for realizing this control function is recorded on a computer readable recording medium, and the program recorded on the recording medium may be realized by being read and executed by a computer system. Herein, such "computer system" is the computer system built in the control unit and includes an OS (Operating System) and hardware for peripheral equipment or the like. Moreover, such "computer readable recording medium" means a portable medium such as a flexible disk, a magneto-optic disk, an ROM (Read Only Memory), a CD (Compact Disk)-ROM or the like and a recording device such as a hard disk or the like built in the computer system. Further, the "computer readable recording medium" may include a device which retains the program in a short time and dynamically, like a communication line when transmitting the program through a network such as internet, etc. or a communication channel such as telephone line, etc. and a device which retains the program for a certain period of time, like volatile memory inside the computer system serving as a server or a client in that case. In addition, the above referred program may be used for realizing a part of the above referred function and also may be used for realizing the above referred function in combination with a program which is already recorded in the computer system.

While the embodiments of the present disclosure has been described in detail with reference to the drawings, specific configuration is not limited to the above referred embodiments and it is understood that various design changes and the like may be made in the invention without departing from the spirit thereof. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. An air conditioner for a vehicle comprising:
a compressor configured to compress a refrigerant;
a first heat exchanger configured to radiate heat of the refrigerant compressed by the compressor into air;
a first expansion valve configured to expand the refrigerant flowing out from the first heat exchanger;
a second heat exchanger configured to heat-exchange the refrigerant flowing out from the first expansion valve with outside air;
a second expansion valve configured to expand the refrigerant flowing out from the second heat exchanger; and
an evaporator configured to cause the refrigerant flowing out from the second expansion valve to absorb heat of air;
wherein the air conditioner for the vehicle is configured to operate in any operation mode of a heating mode, a cooling mode and a dehumidification heating mode, the heating mode being an operation mode in which the refrigerant is circulated through a heating circuit comprising the first heat exchanger, the second heat exchanger and the compressor in the order named so as to cause the first heat exchanger to radiate the heat of the refrigerant,
the cooling mode being an operation mode in which the refrigerant is circulated through a cooling circuit comprising the second heat exchanger, the evaporator and the compressor in the order named, and
the dehumidification heating mode being an operation mode in which the refrigerant is circulated through a dehumidification heating circuit comprising the first heat exchanger, the second heat exchanger, the evaporator and the compressor in the order named so as to cause the first heat exchanger to radiate the heat of the refrigerant and to cause the refrigerant to absorb heat in the second heat exchanger; and
wherein the dehumidification heating circuit further comprises a refrigerant heating means configured to heat the refrigerant, and the refrigerant heating means heats the refrigerant when the operation mode is in the dehumidification heating mode, an outside air temperature is not higher than a predetermined temperature, and when an opening degree of the second expansion valve is larger than an opening degree of the first expansion valve.

2. The air conditioner for a vehicle according to claim 1, wherein, when the refrigerant heating means heats the refrigerant, the opening degree of the first expansion valve is greater than the opening degree of the first expansion valve before the refrigerant is heated.

3. The air conditioner for a vehicle according to claim 1, further comprising an accumulator for separating a gas phase component of the refrigerant and supplying the gas phase component to the compressor, wherein the refrigerant heating means is located between the evaporator and the accumulator.

4. The air conditioner for a vehicle according to claim 1, wherein the refrigerant heating means heats the refrigerant to facilitate the evaporation of the refrigerant.

5. The air conditioner for a vehicle according to claim 1, wherein the first heat exchanger radiates heat of the refrigerant compressed by the compressor into indoor air of the vehicle.

6. The air conditioner for a vehicle according to claim 1, wherein the refrigerant heating means does not heat the refrigerant when the outside air temperature is higher than the predetermined temperature.

7. The air conditioner for a vehicle according to claim 1, wherein when the refrigerant heating means heats the refrigerant, the compressor is controlled such that the volume of the compressed refrigerant sent out from the compressor is increased.

* * * * *